United States Patent [19]

Op den Camp

[11] 4,225,017
[45] Sep. 30, 1980

[54] DISC BRAKE AND SUPPORT STRUCTURE THEREFOR

[75] Inventor: Lutz E. A. Op den Camp, Koblenz, Fed. Rep. of Germany

[73] Assignee: Girling Limited, Birmingham, England

[21] Appl. No.: 759,121

[22] Filed: Jan. 13, 1977

[30] Foreign Application Priority Data

Jan. 17, 1976 [GB] United Kingdom ............... 1865/76

[51] Int. Cl.² ............................................. F16D 65/02
[52] U.S. Cl. .................................... 188/73.3; 188/73.5
[58] Field of Search .................... 188/71.1, 72.1, 72.4, 188/73.1, 73.3, 73.5, 73.6

[56] References Cited

U.S. PATENT DOCUMENTS

| 3,338,339 | 8/1967  | Buyze          | 188/73.3 |
|-----------|---------|----------------|----------|
| 3,346,075 | 10/1967 | Swift          | 188/73.3 |
| 3,368,647 | 2/1968  | Laverdaut      | 188/73.3 |
| 3,391,761 | 7/1968  | Brueder        | 188/73.6 |
| 3,406,792 | 10/1968 | Kennel         | 188/72.4 |
| 3,580,362 | 5/1971  | Falk           | 188/72.4 |
| 3,841,444 | 10/1974 | Baum et al.    | 188/73.5 |
| 3,848,709 | 11/1974 | Tourneur       | 188/73.3 |
| 3,899,052 | 8/1975  | Burnett et al. | 188/73.6 |
| 3,976,169 | 8/1976  | Ogawa          | 188/73.3 |
| 3,999,635 | 12/1976 | Hotchkiss      | 188/73.6 |
| 4,034,858 | 7/1977  | Rath           | 188/73.3 |

FOREIGN PATENT DOCUMENTS

| 2225178  | 1/1974  | Fed. Rep. of Germany | 188/73.5 |
|----------|---------|----------------------|----------|
| 2510037  | 9/1975  | Fed. Rep. of Germany | 188/73.3 |
| 2520493  | 12/1975 | Fed. Rep. of Germany | 188/72.4 |
| 1366446  | 9/1974  | United Kingdom       | 188/73.5 |

Primary Examiner—Edward R. Kazenske
Attorney, Agent, or Firm—Scrivener, Parker, Scrivener and Clarke

[57] ABSTRACT

A disc brake having a caliper member which straddles a minor portion of the periphery of a rotatable disc and which is displaceable with respect to a fixed torque-taking member of the brake for applying friction elements to opposite sides of the disc. The caliper member is slidably mounted on the torque member by means of a pin secured to one of the members and slidable in a recess in the other of the members. The torque member also slidably carries the friction elements and restrains the elements from movement radially of the disc. In order to prevent the caliper member from pivoting about the axis of the pin, the caliper member is held by at least one of the friction elements, this being effected by an interengaging projection and recess, the recess opening in a generally radial direction relative to the axis of the pin.

7 Claims, 7 Drawing Figures

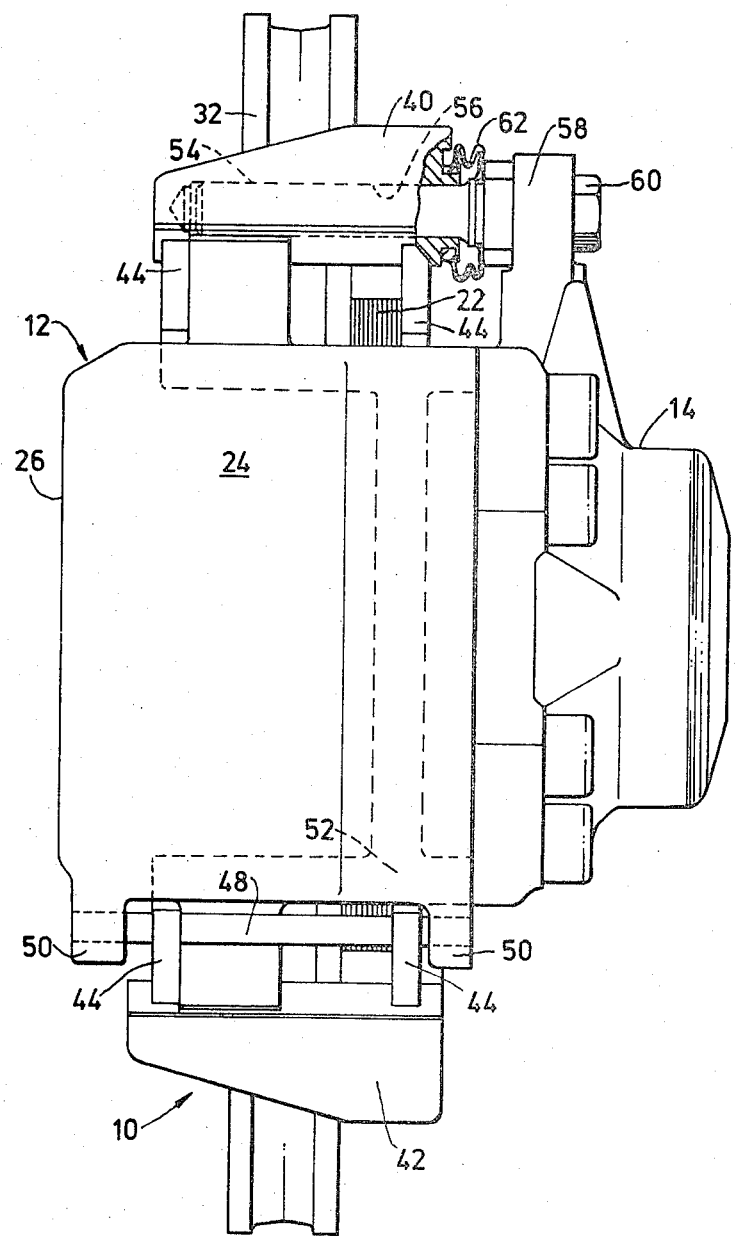
-FIG.1-

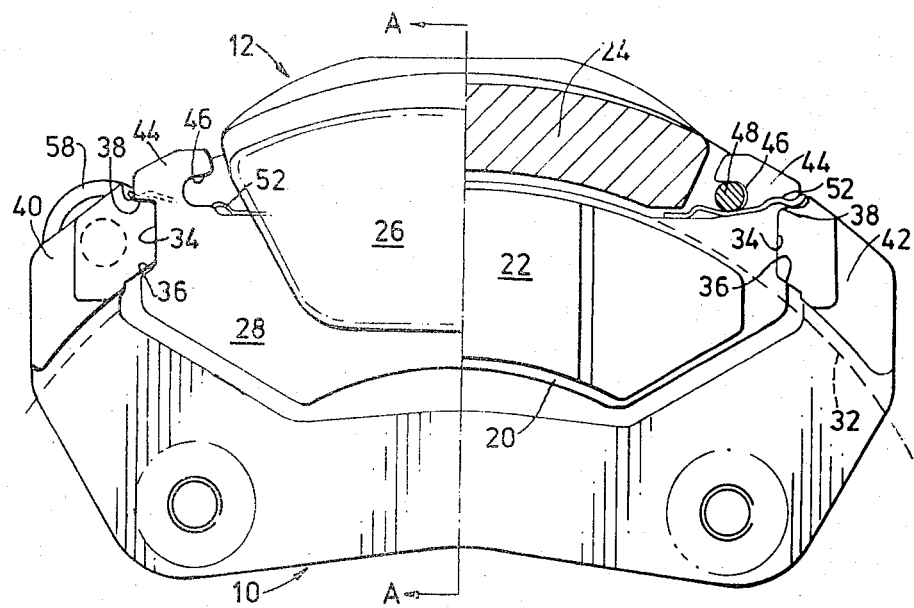
-FIG.2-
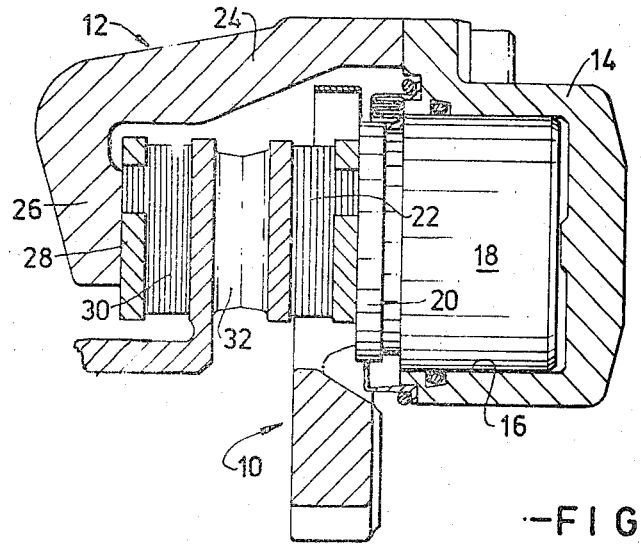
-FIG.3-

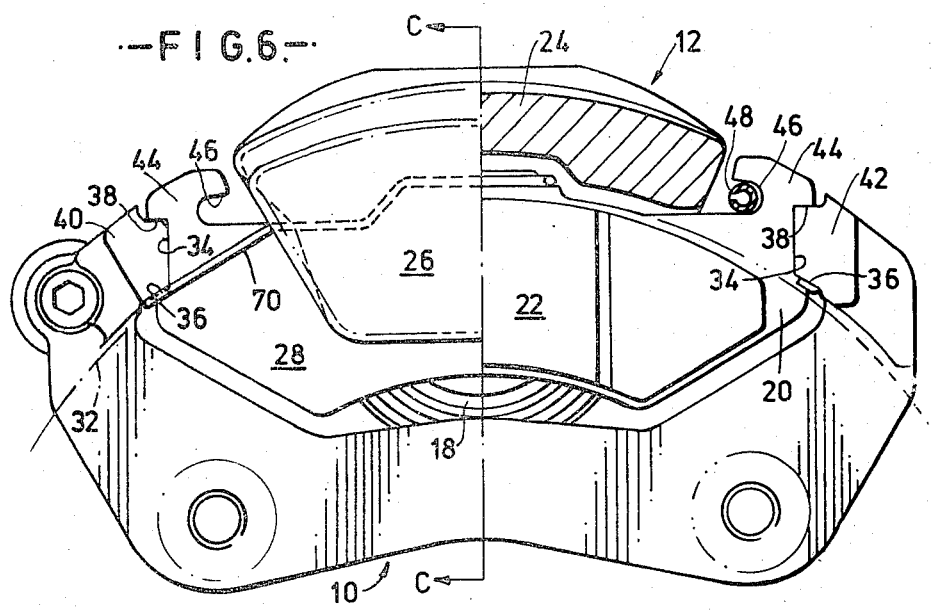

DISC BRAKE AND SUPPORT STRUCTURE THEREFOR

The present invention relates to disc brakes of the type having a caliper which is displaceable, on brake actuation, with respect to a fixed torque-taking member of the brake for applying friction elements to opposite sides of a rotatable disc.

It is known to provide for displacement of the caliper by slidably connecting the caliper to the torque member. The sliding connection between the caliper and the torque member, whilst of necessity being robust, in some previous constructions must be made to a high degree of accuracy to avoid variation in sliding resistance from brake to brake and unless special provisions are made may be adversely affected by accumulation during use of dirt and corrosion.

It is also known to fix at least one of the friction elements to the caliper and slidably mount the friction elements on the torque member. Whilst to some extent avoiding the problems arising from a direct sliding connection between the caliper and torque member, there is still the problem of accurately guiding the friction elements without undue resistance to sliding or looseness which gives rise to rattle. Furthermore, the connection between the caliper and the friction elements has not been readily releasable for replacement of worn friction elements.

In U.S. application Ser. No. 626,184, filed Oct. 25, 1975, and a continuation thereof, Ser. No. 802,809, filed June 2, 1975, and now U.S. Pat. No. 4,151,899, there is described a sliding connection between the caliper member and the torque member, in which a pin is fixed to one of the two members and is slidably received in an opening in the other of the two members. In order to prevent the caliper member from rotating about the axis of the pin, the caliper member is also screwed by means of a bolt or screw lying parallel to the pin, to one of the friction elements which is slidably mounted on the torque member.

The room available for the connection limits the length of the bolt or screw and thus the robustness of the connection. The assembly of the brake parts may be critical in that overtightening of the bolt or screw may damage a part or parts of the brake, and undertightening may result in the bolt or screw subsequently working loose. Furthermore, the limited length of the bolt or screw means that little stretch can be stored therein to provide a tolerance between these two extremes. Also the parts must be accurately manufactured and located during assembly in view of the type of connection between the caliper member and friction element.

One aim of the present invention is to improve the security of fixing of the caliper member to the friction element.

It is an object of this invention, therefore, to provide a brake wherein the caliper is slidably mounted on the torque member by means of a pin and is connected to at least one friction element by means other than a screw or bolt element connection.

It is a further object to provide a brake wherein the connection between the caliper member and the friction element is not subjected to excessive stress during heavy braking.

In addition, it is an object of the invention to provide a friction element having novel means by which the element may be connected to the caliper member.

According to the present invention, there is provided a disc brake comprising a caliper member for straddling a minor portion of the periphery of a rotatable disc and for urging friction elements into braking engagement with opposite faces of the disc, and a torque member which slidably carries at least one of the friction elements and is adapted to restrain said one friction element against movement radially of the disc, the caliper member being slidably mounted on the torque member by means of a pin secured to one of the members and slidable in an opening in the other of the members, and the caliper member being held by said one friction element, by means of interengaging recess means, which open in a generally radial direction relative to the axis of the pin, and projection means, so as to be restrained against pivotal movement about the axis of said pin.

The caliper which preferably has front and rear limbs joined by a crown portion preferably has its crown portion secured at one side by said projection and recess means to the or each friction element, the pin being disposed at the other side of the caliper. In a preferred embodiment, the projection and recess means are resiliently urged into interengagement, and the projection and recess means comprise an elongate member fixed with respect to the caliper and engaging in an open-ended slot in a backplate of the or each friction element. The single elongate member may engage in respective recesses in both friction elements or may engage in a recess in only one of the friction elements.

The resilient interengagement between the elongate member and recess or recesses means that the elongate member need not be an accurate fit in the recess or recesses, excess play being taken up by the resilience of the interengagement, and the arrangement of the connection between the caliper and the or each friction element facilitates assembly and allows for deflection of the torque member without unduly loading the connection.

The pin connection thus acts to locate the caliper for sliding axially of the pin, the arrangement of the elongate member and the recess or recesses hinders rotation of the caliper about the pin's axis, and spurious movements of the caliper relative to the torque member may take place without loading the pin connection.

The invention further provides a disc brake friction element comprising a backplate carrying a block of friction material, the backplate having a lateral abutment surface for transmission of circumferential drag to a co-operating surface of the brake, and at least one portion which extends beyond the friction material and which is formed with an open-ended slot by which a component of the brake may be located with respect to the friction element.

In a preferred embodiment, the backplate has at each of its lateral edges a laterally facing surface by which drag forces experienced by the friction element on being urged into braking engagement with a rotatable disc are transmitted to a fixed part of the brake, and locating surfaces inclined or normal to said laterally facing surface for sliding engagement with complementary surfaces on said fixed part of the brake so as to locate the friction element against displacement radially of the disc. The caliper of the disc brake may then be radially located with respect to the friction element and therefore with respect to the torque member by engagement of a projection of the caliper into the slot.

Preferably, both sides of the backplate have a slotted portion, the two slots having their open ends directed substantially towards each other. The friction element is therefore preferably symmetrical about its top to bottom centre line and can be used on either side of the disc.

the invention is further described, by way of example, with reference to the accompanying drawings, in which:

FIG. 1 is a plan view partly in section, of a disc brake constructed in accordance with the invention;

FIG. 2 is a front view, partly in section, of the brake of FIG. 1;

FIG. 3 is a section on the line A—A in FIG. 2;

FIG. 6 is a front view, partly in section, of the brake of FIG. 4; and

FIG. 7 is a section on the line C—C in FIG. 6.

Figures 4, 5:
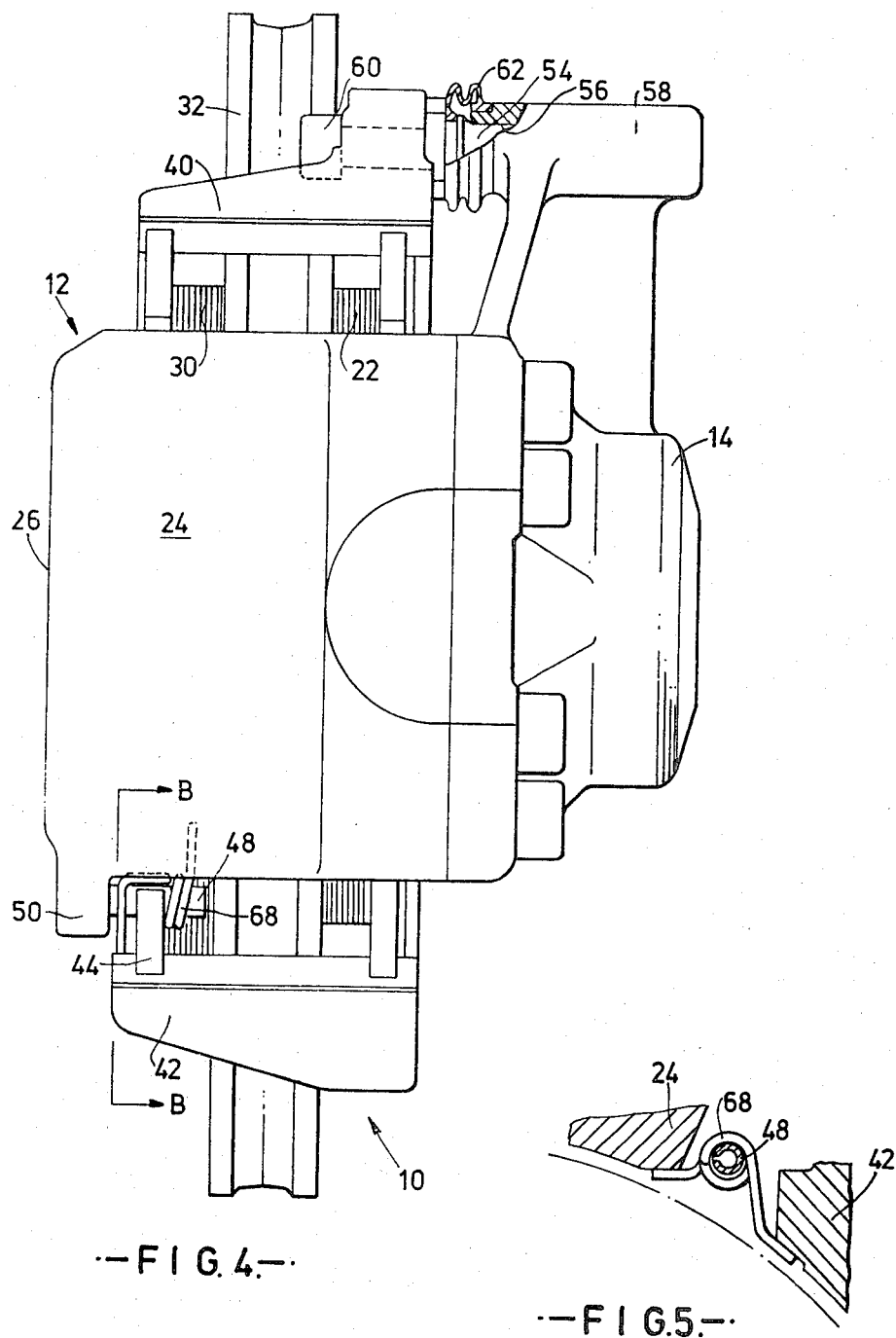
FIG. 4 is a plan view, partly in section, of a modified disc brake constructed in accordance with the invention.
FIG. 5 is a section on the line B—B in FIG. 4.

The disc brake shown in FIGS. 1 to 3 has a torque member generally designated 10 and a caliper generally designated 12 which is slidable with respect to the torque member 10. The caliper 12 has a rear limb 14 formed with a hydraulic cylinder 16 slidably receiving a piston 18 engaging a backplate 20 of an inboard or directly actuated friction element 22. A crown portion 24 of the caliper 12 connects the rear limb 14 to a front limb 26 which engages the backplate 28 of an outboard or indirectly actuated friction element 30. When hydraulic fluid under pressure is introduced into the cylinder 16 by way of a feed port (not shown), the piston 18 urges the inboard friction element 22 against one side of a rotatable disc 32 whereupon the caliper 12 is caused by reaction to slide rearwardly so that its front limb 26 urges the outboard friction element 30 against the other side of the disc 32.

Each of the friction element backplates 20 and 28 has at each of its lateral edges an outwardly facing surface 34, a surface 36 inclined to the surface 34 and a surface 38 normal to the surface 34. The surfaces 34, 36 and 38 slidably engage complementary surfaces formed on arms 40 and 42 of the torque member 10, the arms 40 and 42 extending across the periphery of the disc as is clear from FIG. 1 to engage both of the friction elements. The sliding engagement between the friction element backplates and the torque member arms 40 and 42 retains the friction elements against displacement both circumferentially and radially of the disc 32. At each side of each backplate 20 and 28 is an upward projection 44 formed with an open-ended slot 46 having a longitudinal dimension greater than its transverse dimension. The two slots 46 of each backplate are directed substantially chordally of the disc 32 and have their open ends facing each other.

Engaged in the two slots 46 on one side of the brake is an elongate member in the form of a pin 48 which is mounted between two lugs 50 extending from the crown portion 24 of the caliper. A leaf spring 52 rests on the surfaces 38 and underneath the pin 48. The spring 52 has two bridging portions, each of which spans both friction elements 22, 30 and engages both friction elements at all conditions of element wear. As shown in FIG. 1 in dotted lines and in FIG. 2, a respective bridging portion is provided at each side of the brake, the bridging portions being joined by an elongate strap (shown in dotted lines in FIG. 1) disposed above the element 22. The strap, therefore, only requires the crown portion 24 of the caliper 12 to be relieved in the region of this element 22. There is usually more room for this purpose over the directly actuated friction element 22 than over the indirectly actuated friction element 30. The single leaf spring 52 acts to urge the pads downwards, and to urge the pin 48 and hence the caliper upwards, and thus combines the resilience function mentioned above with a friction element anti-rattle function.

The side of the caliper adjacent to the torgue member arm 40 may also be connected to the friction element backplates by means of a second pin similar to the pin 48 so that the caliper is mounted on the torgue member solely by way of the friction elements. In this case the friction elements may be permitted sufficient movement in the circumferential direction of the disc to permit the two pins to be introduced into their respective backplate slots. The circumferential movement of the friction elements may be controlled by biasing means (not shown) acting in a direction generally against the direction of reverse rotation of the disc so that only the relatively infrequent drag forces experienced by the friction elements during reverse braking need be transmitted through the biasing means.

In the brake shown in FIGS. 1 to 3, however, there is only one pin 48 and there is a direct sliding connection between the caliper and torque member. This direct sliding connection comprises a pin 54 slidable in a blind opening 56 in the torque member arm 40 and clamped to a caliper lug 58 by a bolt 60. The sliding surfaces of the pin 54 and opening 56 are sealed against the ingress of dirt and moisture by a resilient sealing boot 62 which also serves to retain the pin 54 in its opening 56 when the caliper is removed from the torque member following removal of the bolt 60. In the presence of the direct sliding connection provided by the pin 54, the pin 48 serves primarily to secure the caliper against outward pivoting about the pin 54. It is clear that this purpose may equally be achieved by having the pin 48 engage only one of the friction elements, although it is shown engaging both so that both elements may be the same.

To assemble the brake, the friction elements are mounted between the torque member arms 40 and 42 and the spring 52 is placed in position. The caliper is then manoeuvred over the friction pads and the pin 48 is snapped into the backplate slots 48 against the action of the spring 52. Finally, the caliper is pivoted downwardly about the pin 48 until the caliper lug 58 is aligned with the pin 54 whereupon the bolt 60 is screwed into the pin 54 to complete the sliding connection. The pin 48 may therefore be permanently fixed to or even formed integrally with caliper.

As is clear in FIG. 1, the pin 48 extends fully across both friction elements, outside the periphery of the disc, and with the pin permanently fixed to or formed integral with the caliper, it will be apparent that it is impossible for the slots in the backing plates to separate from the pin 48 during the wear life of the pads.

The disc brake shown in FIGS. 4 to 7 is generally similar to that described above and like parts have been given like reference numerals. Again there is a direct sliding connection betwen the caliper and torque member but in this second embodiment the pin 54 is slidable in a blind opening 56 in the caliper lug 58 and clamped by the blot 60 against the torque member arm 40. Another difference resides in the fact that the pin 48 is shorter than its counterpart in the first embodiment and engages with the slot 46 in only the outboard friction element backplate 28. There is therefore only one caliper lug 50. In place of the leaf spring 52 of the first embodiment, there are three wire springs, one of which 68 is wrapped around the pin 48 and has arms engaging the caliper and torque member and the other two of which 70 (omitted in Fig. 4) extend between the two torque member arms 40 and 42 and engage the backplates 20 and 28 so as to urge the pads radially inwardly.

As is the case in the embodiment of FIGS. 1 to 3, the pin 48 may be a permanent part of the caliper as it does not need to be removed for caliper or friction element removal.

As is apparent in FIG. 4, the pin 48 is outside the periphery of the disc and extends axially over a major portion of the block of friction material in its unworn state. The length of the pin with this arrangement can obviously be substantially greater than would be the case if the part of the pin engaging the backing plate had a length equal only to the thickness of the backing plate, as would be the case where the pin is within the disc periphery as shown in U.S. Pat. No. 4,151,899 mentioned above. As with the pin 48 of FIGS. 1—3, the pin the FIG. 4 has no direct engagement with the torque-taking member.

I claim:

1. A disc brake comprising a disc having an axis and first and second opposite faces; a torque taking member fixed relative to said disc and provided with slide surfaces; first and second friction elements provided with slide surfaces and disposed adjacent to said first and second opposite faces respectively, at least said first friction element comprising a backing plate and a block of friction material carried by said backing plate, said backing plate having an extension projecting beyond the periphery of the disc and said block of said friction material, said slide surfaces of said first and second friction elements cooperating with said slide surfaces of said torque taking member such that said first and second friction elements are slidably carried and at least said first friction element is restrained against movement radially of said axis of said disc by said torque taking member; a caliper member arranged to straddle said disc and to move said first and second friction elements against said first and second opposite faces respectively for braking, said caliper member having front and rear limbs disposed adjacent said first and second friction elements respectively, a crown portion joining said limbs, and first and second sides, a slidable assembly mounting said caliper member on said torque taking member, said assembly comprising only a single pin extending directly between said caliper and torque-taking members, releasable connection means securing said single pin to one of said torque and caliper members on said first side of said caliper member, and an opening in the other of said torque and caliper members slidably receiving said pin, said pin being spaced from said friction elements, and inter-engaging projection and recess means on said first friction element and said caliper member on said second side of said caliper member and comprising a recess in a portion of said first friction element defined by an open ended slot in the extension of said backing plate with the open end of said slot extending generally towards the axis of said pin, and a projection carried by said caliper member and engaged within said slot so as to hold said caliper member against pivotal movement about the axis of said pin, said projection having play along said slot and being free of direct engagement with said torque-taking member, said projection having an axial length such that it extends over at least a major portion of the block of friction material in its unworn condition.

2. A disc brake according to claim 1 including resilient means arranged to urge the projection and recess means into interengagement.

3. A disc brake according to claim 2, wherein said resilient means comprise a spring extending between said first friction element and said torque member and acting directly against said projection.

4. A disc brake according to claim 2, wherein said resilient means comprise a spring engaging said caliper member and said torque member.

5. A disc brake according to claim 2, wherein said resilient means comprise springs engaging said torque member and said first and second friction elements.

6. A disc brake according to claim 1, wherein said second friction element has a second open-ended slot, said projection engaging within said second slot also.

7. The disc brake of claim 1 wherein said connection means is screw threaded.

* * * * *